Aug. 2, 1949.   F. D. BRADDON   2,477,574
GYRO VERTICAL
Filed July 21, 1947

INVENTOR
F. D. BRADDON
BY
Herbert H. Thompson
his ATTORNEY.

Patented Aug. 2, 1949

2,477,574

UNITED STATES PATENT OFFICE 2,477,574

GYRO VERTICAL

Frederick D. Braddon, Babylon, N. Y., assignor to The Sperry Corporation, a corporation of Delaware Application July 21, 1947, Serial No. 762,294

5 Claims. (Cl. 74—5.6)

This invention relates to gyro verticals.

An object of the invention is to provide an instrument of this character, particularly adapted to include a stabilizing platform.

A feature of the invention consists in the arrangement of the minor axis of the rotor frame of the instrument spaced from the major axis of the frame.

A further feature of the invention resides in the provision of a mounting for supporting the rotor frame of the gyro vertical spaced from the gimbal ring to pivot about an axis normally perpendicular to a vertical plane including the axis of the ring.

Still another feature of the invention is provided by the gear connections between the ring and the movable elements of the pick-off and torque motor parts thereof.

Another feature of the invention is provided by the gear connections between the rotor frame and the movable elements of the pick-off and torque motor parts thereof situated on the ring.

A further feature resides in the post connection between the platform and the rotor frame of the instrument.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects, features and structural details of the invention, will be apparent from the following description when read in relation to the accompanying drawings, wherein Fig. 1 is an elevation view, partly in section, of a gyro vertical embodying the present inventive concepts;

Figures 1, 2:
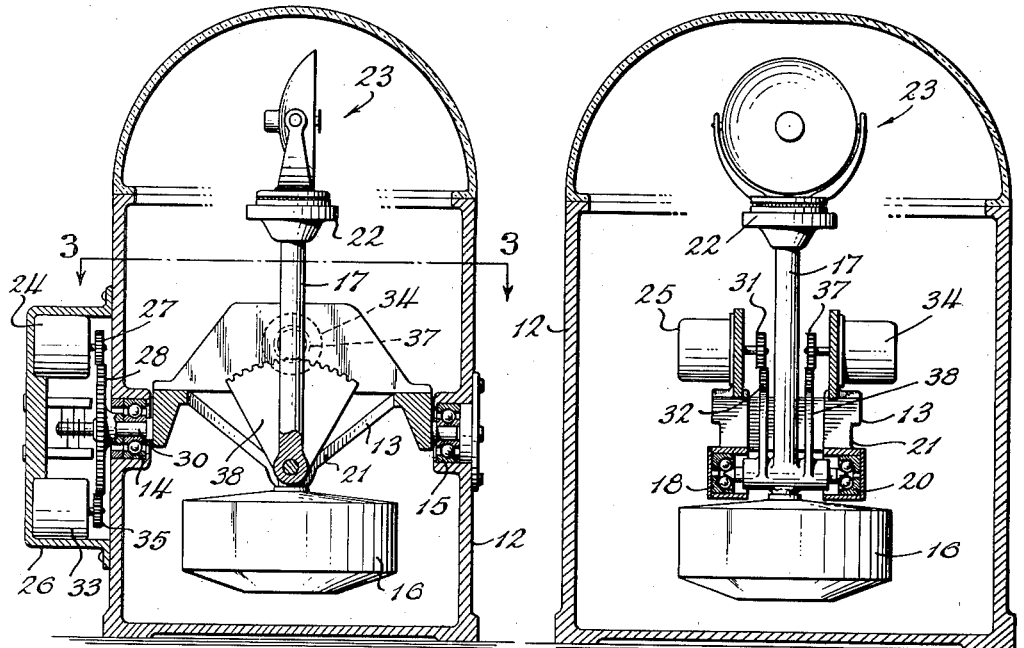
Fig. 2 is an elevation view of the instrument taken at right angles to the showing thereof in Fig. 1.
Figure 3:
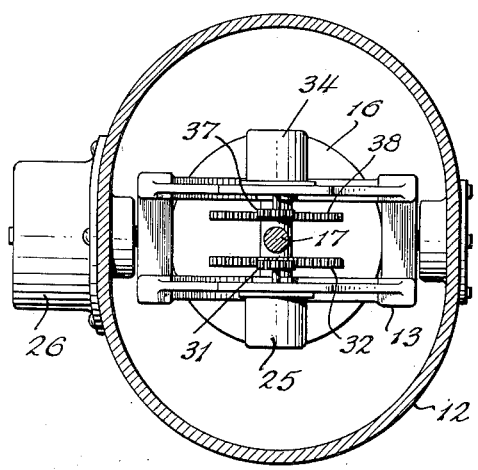
Fig. 3 is a section view of the gyro vertical taken in lines 3—3, Fig. 1.

With particular reference to Figs. 1 and 2, the improved gyro vertical is shown to include a gimbal ring 13 pivotally mounted in bearings 14—15 in a casing 12 to provide the major axis of universal support for a rotor case or frame 16. Frame 16 includes a rotor (not shown) that is suitably spun about a substantially vertical axis. In the construction shown, the case 16 is pivotally mounted on the ring 13 for movement about a minor axis that is spaced from and preferably below its major axis in the casing. The mounting provided includes a post 17 that extends vertically from the top of the case or frame 16 and includes pivot means in the form of trunnions 18 and 20 that engage bearings in ring 13 situated below the bearings 14—15 in the casing 12. The ring 13 of the instrument is shaped to provide an underslung portion 21, Fig. 1, in which the bearing surfaces for the trunnions 18 and 20 are located. The provided mounting supports the rotor frame 16 below the gimbal ring 13 to pivot about a minor axis that is normally perpendicular to a vertical plane that includes the axis of the ring defined by bearings 14, 15. If desired, the position of the frame could be reversed so that its minor axis is spaced above its major axis with the post 17 extending downwardly.

The improved gyro vertical is particularly adapted for use in stabilizing an object or device that is mounted on the rotor case thereof. In this connection, the instrument includes a platform 22 at the top of post 17 on which an object or device, such as a radiant energy scanning device, indicated generally at 23, is located. As shown, the scanner may include a yoke that is mounted to move about a vertical axis on the platform. It is desired to point out that the present invention is not concerned with the type of object or device that is stabilized or the manner in which the same is mounted on the platform. However, the described mounting provisions for the frame or case are such as to counterbalance the weight of the post, platform and stabilized object or device so that the frame or case as a unit is universally supported in neutral equilibrium in the casing.

Figure 4:
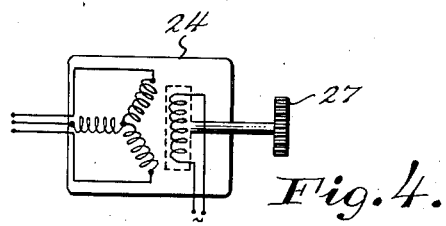
Fig. 4 is an enlarged detail view of one of the pick-offs of the improved instrument.

A two-part pick-off 24 at the gyro vertical provides a signal with movement of the rotor case from a null position about its major axis relative to casing 12. A similar pick-off generally indicated at 25 likewise detects movement of the rotor case from a null position about its minor axis relative to casing 12. As shown in Fig. 4, the pick-offs 24 and 25 may be electrical signal generators of the Selsyn type provided with wound stator and rotor parts that produce an output of phase and magnitude depending on the direction and extent of the angular displacement between the parts thereof from the null position.

As shown in Fig. 1, the stator of pick-off 24 is fixedly mounted on a cover plate 26 that is secured in a suitable manner (not shown) to the casing 12. The rotor of the pick-off 24 provides a movable part (Figs. 1 and 4) with a gear 27 connected thereto that meshes with a gear 28 mounted on the ring 13 with its axis coincident with the axis of the ring. Specifically, gear 28 is mounted on the axis defining trunnion 30 of ring 13.

The stator of pick-off 25 is mounted on the gimbal ring 13. The rotor or movable part of this pick-off has a gear 31 connected thereto that meshes with a gear sector 32 fixed to the pivotal mounting at the top of the case or frame 16. Sector 32 is arranged on the mounting so that its axis is coincident with the minor axis of the frame or case.

Figure 5:
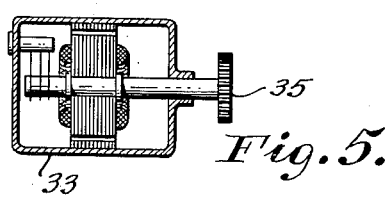
Fig. 5 is a view similar to Fig. 4 of one of the torque motors of the gyro vertical.

The gyro instrument further includes a pair of torque motors 33 and 34, the first of which is effective about the major axis of frame 16 and the other of which is effective about the minor axis of the frame. Motors 33 and 34 may have a construction similar to that of a two-phase induction motor with a squirrel cage rotor, such as shown in Fig. 5 of U. S. Patent No. 2,392,370 to Esval et al. The squirrel cage of this motor, as shown by motor 33, Fig. 5, may form the stator part thereof and the provided winding may be formed as part of the rotor. As shown in Figs. 2 and 5, the rotor of motor 33 has a gear 35 connected thereto that meshes with gear 28 of the instrument. The stator part of motor 33 is fixedly mounted in the cover plate 26 in a suitable manner (not shown). Motor 34 includes a stator part that is fixedly mounted on the ring 13 in the position shown in Fig. 2. The rotor of motor 34 has a gear 37 connected thereto that meshes with a gear sector 38 fixedly connected to the mounting at the top of the rotor case or frame 16. Elements 32 and 38 provide a pair of coaxial gear sectors fixed to the mounting at the top of the frame having an axis coincident with the minor axis of the frame. Gear sectors 32 and 38 extend vertically from the mounting on opposite sides of the post 17 of the gyro vertical. It will be understood that motor 33 when effective exerts a torque about the axis of the instrument defined by bearings 14, 15 by way of the meshed gears 35 and 28. Motor 34 operates to exert a torque about the axis of the instrument defined by trunnions 18 and 20 by way of the gear 37 and the gear sector 38 meshed therewith. Also, with tilt of the frame from a null position about its major axis, gear 28 actuates the movable element of pick-off 24 through gear 27 so that an output signal is produced. With tilt from a null position of frame 16 about the minor axis of the instrument, gear sector 32 actuates the movable element of pick-off 25 through gear 31 to provide an output.

The reference provided to control the described gyro vertical may take the form of one or more remotely located pendulums (not shown) that position pick-offs (not shown) whose outputs operate the respective torque motors 33 and 34. This type of gyro vertical slaving system is described and claimed in my copending application Serial No. 713,189, filed November 29, 1946.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro vertical, the combination of a gimbal ring, a rotor frame, a minor axis pivotal mounting at the top of the frame connecting the same to said ring, a gear sector fixed to said mounting having an axis coincident with the minor axis of the frame, a torque motor mounted on said ring having a rotor with a gear connected thereto meshing with said gear sector, wherein said gimbal ring defines the major axis of the frame and the pivotal mounting of the frame on the ring is so located that the minor axis thereof is spaced below the major axis.

2. In a gyro vertical, the combination of, a gimbal ring, a rotor frame, a minor axis pivotal mounting at the top of the frame connecting the same to said ring, a gear sector fixed to said mounting having an axis coincident with the minor axis of the frame, and a pick-off mounted on said ring having a movable element with a gear connected thereto meshing with said gear sector.

3. A gyro vertical as claimed in claim 2, in which said gimbal ring defines the major axis of the frame and the pivotal mounting of the frame in the ring is so located that the minor axis thereof is spaced from the major axis.

4. In a gyro vertical, the combination of, a gimbal ring, a rotor frame, a minor axis pivotal mounting at the top of the frame connecting the same to said ring, a pair of coaxial gear sectors fixed to said mounting having an axis coincident with the minor axis of the frame, a torque motor mounted on said ring having a rotor with a gear connected thereto meshing with one of said gear sectors, and a pick-off mounted on said ring having a movable element with a gear connected thereto meshing with the other of said gear sectors.

5. A gyro vertical as claimed in claim 4, in which said gimbal ring defines the major axis of the frame and the pivotal mounting of the frame in the ring is so located that the minor axis thereof is spaced from the major axis.

FREDERICK D. BRADDON.

REFERENCES CITED

The following references are of record in the file of this patent:

UNITED STATES PATENTS

| Number | Name | Date |
|---|---|---|
| 1,141,099 | Anschutz-Kaempfe | June 1, 1915 |
| 1,545,812 | Chessin | July 14, 1925 |
| 1,573,343 | Holeka | Feb. 16, 1926 |
| 1,781,746 | Brown | Nov. 18, 1930 |
| 1,840,104 | Anschutz-Kaempfe | Jan. 5, 1932 |
| 1,932,210 | Glitscher | Oct. 24, 1933 |
| 2,433,837 | Dawson | Jan. 6, 1948 |

FOREIGN PATENTS

| Number | Country | Date |
|---|---|---|
| 8,952 | Great Britain, 1912 | Apr. 16, 1913 |